(12) United States Patent
Gossop

(10) Patent No.: US 6,192,992 B1
(45) Date of Patent: Feb. 27, 2001

(54) MACHINE FOR SOIL PREPARATION

(76) Inventor: John Gossop, Croft Farm, Swinefleet Common, Nr Goole, DN14 8DW, North Humberside (GB)

( * ) Notice: Subject to any disclaimer, the term of this patent is extended or adjusted under 35 U.S.C. 154(b) by 0 days.

(21) Appl. No.: 09/142,709

(22) PCT Filed: Mar. 13, 1997

(86) PCT No.: PCT/GB97/00692

§ 371 Date: Sep. 14, 1998

§ 102(e) Date: Sep. 14, 1998

(87) PCT Pub. No.: WO97/34466

PCT Pub. Date: Sep. 25, 1997

(30) Foreign Application Priority Data

Mar. 15, 1996 (GB) ................................... 9605490

(51) Int. Cl.[7] .............. A01B 5/00; A01D 17/02; E01C 19/05

(52) U.S. Cl. .......... 172/133; 172/200; 171/132; 404/91

(58) Field of Search .............. 37/388, 390, 391, 37/393, 463, 464, 189, 190; 171/83, 64, 111, 131, 132; 172/133, 197, 199, 200; 404/92, 91

(56) References Cited

U.S. PATENT DOCUMENTS

| | | |
|---|---|---|
| 1,261,521 * | 4/1918 | Hanson . |
| 1,276,843 | 8/1918 | Wentworth . |
| 1,786,226 | 12/1930 | Bradley . |
| 1,880,611 * | 10/1932 | Vodon . |
| 1,938,755 * | 12/1933 | Swearingen . |
| 2,060,688 | 11/1936 | Pryor et al. . |
| 2,110,997 | 3/1938 | Mayfield . |
| 2,783,698 | 2/1957 | Bambi . |
| 2,785,613 | 3/1957 | Staats, Sr. . |
| 2,788,725 | 4/1957 | Wilkey et al. . |
| 4,453,856 * | 6/1984 | Chriostri et al. ............ 404/91 |
| 4,676,688 * | 6/1987 | Caradot ....................... 404/91 |

FOREIGN PATENT DOCUMENTS

| | | |
|---|---|---|
| 2566615 | 1/1986 | (FR) . |
| 2588488 | 4/1987 | (FR) . |
| 2232334 | 12/1990 | (GB) . |
| 97/34466 | 9/1997 | (WO) . |

* cited by examiner

Primary Examiner—Eileen D. Lillis
Assistant Examiner—Raymond Addie
(74) Attorney, Agent, or Firm—Jenkins & Wilson, P.A.

(57) ABSTRACT

A machine for preparation of soil comprises a soil lifting device for lifting a layer of soil, a soil breaking device for breaking up the layer of soil, and a frame, the soil lifting device and soil breaking device being attached to the frame.

12 Claims, 2 Drawing Sheets

MACHINE FOR SOIL PREPARATION

The present invention relates to a machine for soil or earth preparation, particularly although not exclusively in the agricultural field.

BACKGROUND ART

In the preparation of fields for planting of agricultural crops, the aim of soil preparation is to bury a crop residue and weeds from a previous crop, loosen the soil, and provide a suitable tilth for the crop to be planted. Many crops require relatively small soil particles on the uppermost layer of the soil, at a depth of a few centimeters to tens of centimeters from the surface, this being the depth at which the seed for the crop is sown.

Conventional methods of soil preparation include a primary cultivation and a secondary cultivation. In the primary cultivation, crop residue from the previous crop, and weeds are buried within the soil, and in the secondary cultivation, an uppermost layer of the soil is broken down into relatively small sized particles.

The most popular tool for carrying out the primary cultivation for hundreds of years has been the conventional plough. The plough inverts the soil, giving excellent burial of surface residues. However, there are disadvantages with the conventional plough. Firstly, because the soil is in contact with the plough share, mould board and skimmer, there are high levels of friction in drawing the plough through the soil. Where the plough is towed by a wheeled tractor, because the force necessary to pull the plough is transmitted to the ground through the tractor wheels, there may occur wheel slippage in wet conditions, which causes the soil underneath the tractor wheels to smear and compact, in the bottom of the furrow. The smeared and compacted soil impedes drainage from the furrow.

Secondly because a plough body turns soils over into a space left by a preceding plough body, it is not possible to start at one side of a field and work up and down a field, without the use of a reversible plough which has a set of left hand mould boards for ploughing down a field in one direction, and another opposite set of mould boards for ploughing up the field in an opposite direction.

The reversible plough is expensive, and has the operational complication of switching between mould boards for ploughing in different directions.

A third problem with the conventional plough is that as tractors increase in size, farmers require ploughs with more furrows. As each furrow must be staggered on the plough frame, the total length of the plough frame becomes unmanageable.

Once the primary cultivation of the land has been completed by ploughing, the secondary cultivation is carried out on the soil structure let by the plough. Machines for secondary cultivation include trailed or powered harrows, which break clods by striking, cutting or crushing, to reduce clod size and consolidate the seed bed.

FR-A-2566615 describes a machine for burying stones under finer soil to reclaim stony land. The machine uses a vibrating sieve to grade the stones. However, the machine does not cultivate the soil in so far as the soil is not broken up into smaller particles.

U.S. Pat. No. 2,785,613, U.S. Pat. No. 2,110,997 and U.S. Pat. No. 1,786,226 describe machines for the preparation of farmland. Each discloses means for breaking the soil such as by means of a hammer mill, a shaker and a toothed cylinder respectively. However, in each case objectionable material, such as stones, is conveyed to a dump box or the like.

DISCLOSURE OF THE INVENTION

Specific embodiments of the present invention aim to provide a single machine of cultivation of land in one or more passes.

According to one aspect of the present invention there is provided a machine for preparation of soil comprising a soil lifting means for lifting a layer of soil, a soil breaking means for breaking up the layer of soil, and a frame, the soil lifting means and soil breaking means being attached to the frame, characterised in that said soil breaking means comprises a web or grader, the soil being dropped onto or thrown towards said web or grader such that impact of the soil with said web or grader causes a reduction of the soil into smaller particles, and wherein the machine comprises a web or grader for grading the soil particles into coarse and fine particles, the soil layer being re-laid onto the exposed soil bed such that the coarse particles are situated underneath the fine particles in the re-laid soil layer. Suitably, the machine is adapted to be towed behind a tractor unit. As the machine moves in a forward direction, the soil lifting means lifts a surface layer of soil, thereby exposing a soil bed or subsoil bed. The soil layer is broken up into smaller sized particles by the soil breaking means, and is then re-laid onto the soil bed. By lifting and breaking up the upper layer of soil in an area of land, the soil layer can be broken down into smaller sized soil particles. Preferably, the soil layer is lifted to a height above a height of the original undisturbed soil layer.

Preferably, the web/grader for grading the soil particles also performs the function of breaking up the soil. The soil layer is preferably broken up into coarse and fine soil particles.

Preferably, the soil layer is broken by being dropped from a height above the height of the original undisturbed soil layer.

Preferably, said lifting means comprises one or a plurality of shares, arranged to cut into the soil layer as the machine is drawn in a forward direction.

Preferably, the soil lifting means comprises a conveyor. Preferably, the conveyor carries the soil in a direction upwardly and towards the rear of the machine. Preferably, the conveyor is angled to convey the soil to a height above the height of the original undisturbed soil layer. The conveyor may be a rubber conveyor, although any suitable material may be used. Preferably, the conveyor is driven by a power take off shaft of the tractor.

The soil breaking means may further comprise one or a plurality of rotors or tines arranged to break the soil layer as it travels up the conveyor. One or a plurality of rollers may be included to crush lumps of soil.

Preferably, the web or grader is situated under an upper end of the conveyor. The web or grader may be vibrated. The web or grader may be provided with one or a plurality of agitators or scrubbers.

Preferably the soil breaking means comprises two web or grader devices. A first web or grader device may be arranged substantially horizontally and a second web or grader may be arranged substantially vertically or at a slight, preferably rearwards, angle to the vertical. Preferably, the second web/grader is located above and towards the rear of the first web/grader. Preferably the second web/grader has a forward face adapted in use to move upwards.

Preferably the machine comprises a further soil breaking means mounted forwardly of the first soil breaking means for partially cutting or breaking the soil before it passes to the soil lifting means. Preferably, the further soil breaking means comprises one or more discs or a roller which may be adjustable to control the depth of the shares. Preferably, the roller incorporates one or more discs, or tines spaced across its width.

The relatively fine particles may occupy predominantly an upper portion of the re-laid soil layer to a depth 0 to 90 mm from the surface of the re-laid soil layer, however there is no limit to the depth of the finer particles within the re-laid layer Preferably, the soil layer drops onto the web/grader at rear end of web/grader. Preferably, the finest soil particles fall through a rear most end of the web/grader and the coarsest particles fall through or from a front end of the web/grader, such that as the web/grader moves forward the coarsest particles are deposited directly onto the soil bed or subsoil bed, and successively finer soil particles are re-laid over the coarse particles as the machine moves forward.

Some, or most of the surface trash and crop residue may also be carried by the web or grader to be deposited under the finer particles. On stony soil, the larger stones may be deposited under the smaller stones.

There may be provided a levelling device, preferably following the web/grader, for levelling out a surface of the re-laid soil layer.

There may be provided, at a rear end of the machine, a seed planter apparatus, for planting or sowing seeds onto the prepared soil.

A rear end of the frame may be supported by a plurality of wheels. The plurality of wheels may be preferably situated at a position rearward of a position at which the soil layer is re-laid, such that the wheels travel over the re-laid soil layer. The wheels may act to compress and thereby consolidate the re-laid soil layer.

The machine may be fully mounted to a tractor and be capable of being lifted by a tractor.

DESCRIPTION OF THE DRAWINGS

For a better understanding of the invention, and to show how embodiments of the same may be carried into effect, reference will now be made, by way of example, to the accompanying diagrammatic drawings, in which.

Referring to

BEST MODE FOR CARRYING OUT THE INVENTION

Figure 1:
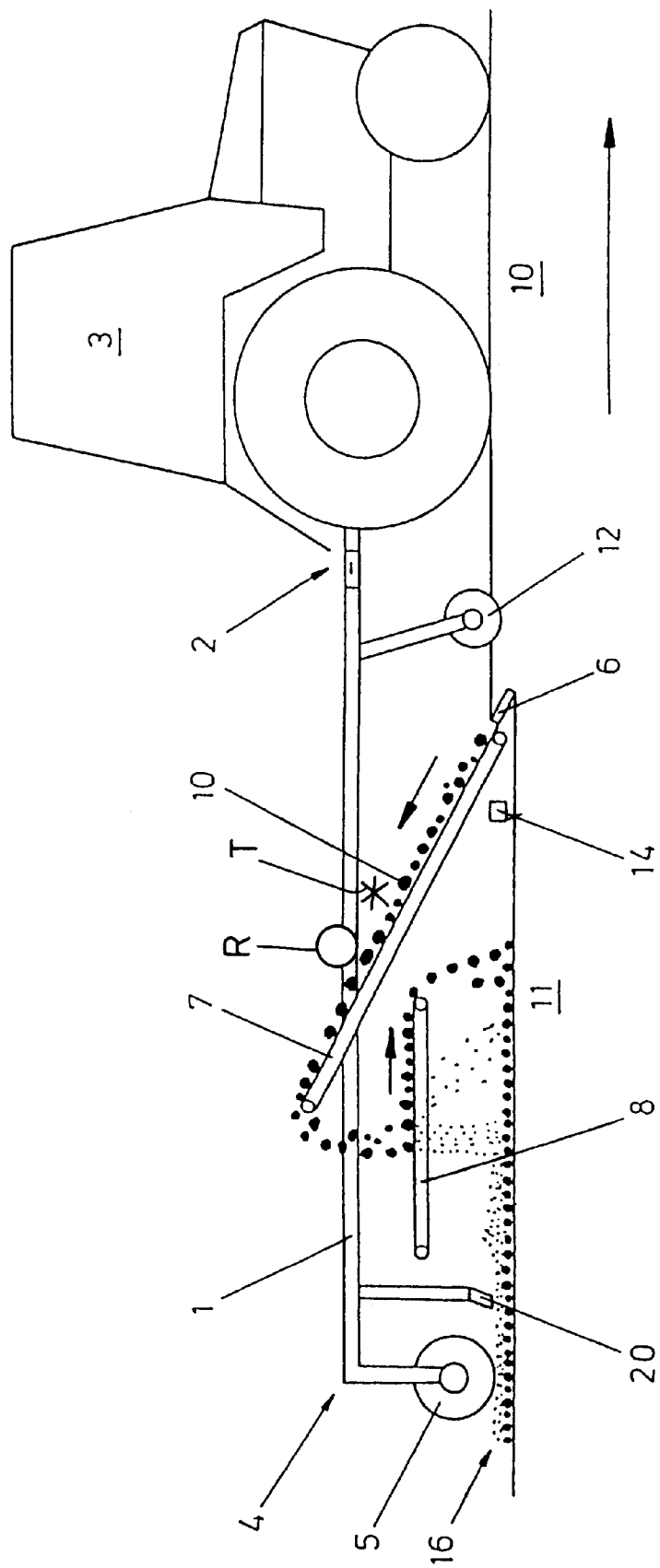
FIG. 1 of the accompanying drawings, there is shown schematically a soil preparation machine according to a first specific embodiment of the present invention, as towed by a conventional tractor unit.

Referring to FIG. 1 of the accompanying drawings, a soil preparation machine comprises a frame 1, a plurality of wheels 5 supporting the frame; one or a plurality of shares 6; first and second forwardly mounted upright discs 12, 13; a conveyor 7 for receiving a soil layer 10; one or more subsoil tines 14 for tining an exposed soil bed or subsoil bed 11 behind the shares; a web or grader 8 for breaking up, grading and re-laying the soil layer 10 onto the bed 11; and a levelling bar 20 for levelling off an upper surface of the re-laid soil layer 16.

The frame 1 is arranged to be supported at a forward end 2 by a conventional tractor unit 3, and supported at a rearmost end 4 by the one or plurality of wheels 5 attached to the frame 1. The one or a plurality of shares 6 and the conveyor 7, constitute a soil lifting means. The shares are angled downwardly and in a direction towards the front of the frame, so that when the frame is drawn in a forward direction, the shares dig into the undisturbed soil layer 10 and lift the soil layer 10 onto the conveyor 7. The conveyor is driven by a power take off shaft from the tractor, for lifting the soil bed in a direction upwardly and towards the rear of the frame. The vibrating web or grader 8 is positioned underneath an upper end of the conveyor 7, such that soil material having travelled up the conveyor to a height above the level of the original undisturbed soil layer 10 falls off the end of the conveyor onto the web or grader.

The shares may be plough shares, although preferably the shares are substantially flat.

Where the machine is used on heavy soil, additional parts may be added to aid clod size reduction, e.g. the rotors or tines to engage the soil as it flows up the conveyor and/or falls onto the grader. One or a plurality of rotors or tines for engaging and further breaking up the soil as it passes up the conveyor, and/or as it falls onto the grader or web may be provided.

The web or grader 8 may be arranged so as to grade finer material at a rear end of the web or grader, and grading successively coarser soil particles towards the front the web/grader.

As the machine move forwardly, the soil layer 10 is removed and transported up the conveyor and to the back of the web/grader. Coarse soil particles are transported to the front of the web/grader and dropped onto the exposed soil bed behind the shares. As the soil material falls onto the rear of the web/grader, fine particles of soil fall through and form the re-laid soil layer 16 laid on top of the coarser particles. As the machine moves forward, successively finer particles are dropped on top of the coarse particles, until the finest material, which is dropped at the back of the web/grader is dropped upper most on the re-laid soil layer 16. The grader could be a web/spools, or star wheels of the type commonly used on potato harvesters to separate the soil from potatoes.

The grader may be removable and replaceable with a grader having differently sized gaps, and the particle size of the soil may be adjusted by removal and replacement of the grader. The grader may comprise two or more short graders used in cascade, a first short grader being set above a second short grader, the first short grader having smaller gaps than the second short grader, having larger gaps.

Behind the web/grader may be provided a levelling bar 20 for levelling the top of the re-laid soil layer 16. The levelling bar 20 may compensate for any uneven distribution of soil through the grader.

The wheels 5 supporting the rear of the frame run over the re-laid soil layer 16. The wheels 5 may serve the dual purpose of supporting the rear of the frame, and consolidating the seed bed. There may be provided one or more subs-soil tines, for tining the exposed soil bed immediately behind the share. The shallow sub-soil tines behind the share may aid drainage under the seed bed.

The working depth of the undisturbed soil layer 10 to be lifted is adjusted either by setting the tractor lift arms, or using adjustable depth wheels at the front of the frame.

Preferably, the first and second discs, placed either side of share at the front of the frame, are provided for the purpose of making a clean cut in a direction along the direction of travel of the machine.

There may be mounted a seeder unit at the rear of the frame, in order to place seed in the soil prior to the seed bed being traversed by the wheels 5.

By varying the conveyor speed on the machine, and by pulling the machine in the forward direction selected by use of different gear and throttle settings on the tractor, it may be possible to achieve a well controlled seed bed formation of the re-laid soil layer 16 at the rear of the machine.

The web/grader speed may be adjustable and variable to allow control of the re-laid soil layer 16.

Figure 2:
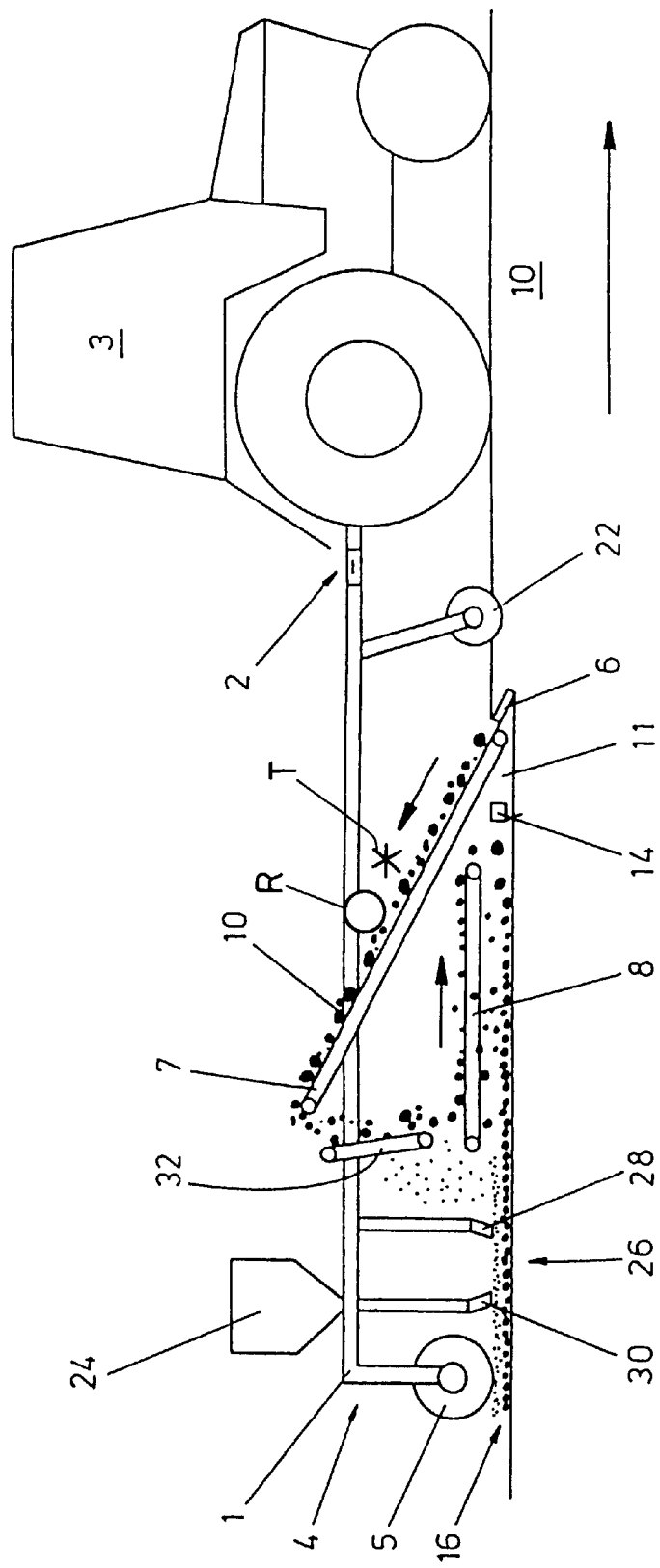
FIG. 2 shows schematically a second specific embodiment of the invention, as towed by a conventional tractor unit.

Referring to FIG. 2, the machine is substantially similar to that shown in FIG. 1 with some modifications. The same reference numerals are used to describe like parts. In the second embodiment, the discs 12, 13 as described with reference to FIG. 1 are incorporated into a full width roller 22 i.e. extending across substantially the width of the machine. The roller 22 is adjustable and controls the depth of the shares. The roller may incorporate other discs, spikes or tines at intervals across its width to partially cut or break the soil before it enters the machine, thereby contributing to the finished seed-bed.

A seeder unit 24 is mounted at the rear of the frame 1. The levelling device 26 comprises two levelling bars supported by the frame. One levelling bar 28 lies transversely to the machine and at a slight forward angle to the vertical; the other levelling bar 30 lies transversely at a slight rearward angle to the vertical. Such a levelling device can provide improved levelling of the top layer.

Because of the forward travel of the entire machine and the rearward travel of the conveyor 7 the soil does not drop straight down but is thrown partly towards the back of the machine. It has been found that a web 32 in a near vertical position with the first face of the web travelling upwards is effective at breaking some of the soil clods and allowing fine soil through. The larger soil particles and trash roll by gravity down the face of the web on to the main web 8. Alternatively, other breaking and grading means could be used instead of this vertical web, such as rotors, tines and rollers.

The web or grader 32 and web or grader 8 may comprise any suitable material. The machine may find application in various agricultural uses as follows:

(i) Post harvest: some farmers like to cultivate stubble straight after harvest to mix the stubble with soil to encourage bacterial breakdown and to germinate weed seeds, so keeping the soil clean. The machine according to the specific embodiments may be used for post harvest stubble mixing, instead of the conventional disc harrow or tined cultivator. The machine may work shallowly and quickly in this mode of operation. The machine could also be used at a greater soil depth, to loosen and partly break up the soil to be later cultivated by the same machine or another machine.

(ii) Seed bed preparation: seed bed preparation as described hereinabove may be carried out either on previous stubble, or on land already cultivated by the machine, or another prior art machine.

(iii) Beach improvement: the machine may be used for the improvement of seaside beaches having a mix of sand and stones by burying the stones under a layer of sand.

It will be appreciated that the machine may be used in any suitable circumstance requiring the cultivation or preparation of soil or land.

What is claimed is:

1. A machine for preparation of soil comprising a soil conveyor assembly for lifting a layer of soil (10) from a soil bed, a soil grading means (8) for breaking up the layer of soil, said soil conveyor assembly comprising at least one soil share (6) and an upwardly and rearwardly mobile conveyor (7); and said soil grading means comprising a forwardly moving grading belt (8) where said belt (8) has a rearward end and a forwardmost end; whereby fine soil particles fall through forwardly moving grading belt (8) onto the exposed soil bed and course soil particles are conveyed forwardly on grading belt (8) to the forwardmost end thereof where they also fall onto the exposed soil bed, whereby the soil layer is re-laid onto the exposed soil bed so that the course particles will be subsequently covered by and situated underneath the fine particles in the re-laid soil layer (16) after the machine passes thereover, further comprising one or a plurality of rotors or tines (T) positioned on the upwardly and rearwardly mobile soil conveyor arranged to break the soil layer as it travels up the conveyor (7).

2. A machine as claimed in claim 1, wherein the soil grading means (8,32) for grading the soil particles also performs the function of breaking up the soil.

3. A machine as claimed in claim 1, wherein the soil layer (10) is broken by being dropped from a height above the height of the original undisturbed soil layer.

4. A machine as claimed in claim 1, wherein the at least one share is (6) are positioned in front of the soil conveyor assembly, arranged to cut into the soil layer as the machine is drawn in a forward direction.

5. A machine as claimed in claim 1, including one or a plurality of rollers (R) positioned on the upwardly and rearwardly mobile soil conveyor to crush lumps of soil as the soil travels up the conveyor (7).

6. A machine as claimed in claim 1, wherein the soil grading means (8) is vibrated.

7. A machine as claimed in claim 1, wherein the machine comprises a further soil breaking means (12,13, 22) mounted forwardly of the rotor or tines (T) for partially cutting or breaking the soil before it passes to the upwardly and rearwardly mobile soil conveyor (7).

8. A machine as claimed in claim 7, wherein said further soil breaking means comprises one or more discs (12, 13) or a roller (22).

9. A machine as claimed in claim 1, wherein, in use, the finest soil particles fall through a rear most end of the forwardly moving grading belt (8) and the coarsest particles fall through or from a front end of the grading belt (8), such that as the grading belt (8) moves forward the coarsest particles are deposited directly onto the soil bed or subsoil bed, and successively finer soil particles are re-laid over the coarse particles as the machine moves forward.

10. A machine as claimed in claim 1, wherein a levelling device comprising a plurality of leveling bars (20, 28, 30) is provided for levelling out a surface of the re-laid soil layer (16).

11. A machine for preparation of soil comprising a soil conveyor assembly for lifting a layer of soil (10) from a soil bed, a soil grading means (8) for breaking up the layer of soil, said soil conveyor assembly comprising at least one soil share (6) and an upwardly and rearwardly mobile conveyor (7) where said conveyor (7) has an uppermost end; and said soil grading means comprising a forwardly moving grading belt (8) where said belt (8) has a rearward end and a forwardmost end; whereby fine soil particles fall through forwardly moving grading belt (8) onto the exposed soil bed and course soil particles are conveyed forwardly on grading belt (8) to the forwardmost end thereof where they also fall onto the exposed soil bed, whereby the soil layer is re-laid onto the exposed soil bed so that the course particles will be subsequently covered by and situated underneath the fine particles in the re-laid soil layer (16) after the machine passes thereover, further comprising a vertically inclined grading belt (32) arranged substantially vertically and positioned between the uppermost end of the upwardly and rearwardly mobile conveyor and the rearward end of the forwardly moving grading belt, whereby the vertically inclined grading belt also acts to reduce the soil into fine and coarse soil particles and wherein at least some of the fine soil particles pass through the vertically inclined grading belt onto the exposed soil bed therebeneath and the coarse soil particles fall onto the forwardly moving grading belt and are conveyed forwardly to the forwardmost end thereof where they fall onto the exposed soil bed to be subsequently covered by the fine soil particles.

12. A machine as claimed in claim 11 wherein the vertically inclined grading belt (32) has a forward face that moves upwards.

* * * * *